(12) United States Patent
Kang et al.

(10) Patent No.: US 8,382,324 B2
(45) Date of Patent: Feb. 26, 2013

(54) RADIATION STRUCTURE WITHOUT LIGHT GUIDING BOARD

(75) Inventors: Chih-Chieh Kang, Yung Kang (TW);
Jeng-Feng Lin, Yung Kang (TW);
Yu-Chang Wu, Yung Kang (TW);
Chun-Xian Yu, Yung Kang (TW);
Tai-Jung Chen, Yung Kang (TW);
Shao-Tun Chuang, Yung Kang (TW)

(73) Assignee: Southern Taiwan University, Yung Kang, Tainan County (TW)

( * ) Notice: Subject to any disclaimer, the term of this patent is extended or adjusted under 35 U.S.C. 154(b) by 259 days.

(21) Appl. No.: 12/770,173

(22) Filed: Apr. 29, 2010

(65) Prior Publication Data
US 2011/0267839 A1    Nov. 3, 2011

(51) Int. Cl.
*F21V 21/00*    (2006.01)
(52) U.S. Cl. ............ 362/249.02; 362/225; 362/555; 362/560; 362/609; 362/613
(58) Field of Classification Search .......... 362/225, 362/235, 249.02–249.03, 555, 560–561, 362/608–609, 612–613, 800
See application file for complete search history.

(56) References Cited

U.S. PATENT DOCUMENTS

| | | | | |
|---|---|---|---|---|
| 5,453,855 | A | * | 9/1995 | Nakamura et al. ............. 349/58 |
| 6,024,462 | A | * | 2/2000 | Whitehead .................... 362/618 |
| 6,637,923 | B2 | * | 10/2003 | Amano ........................ 362/545 |
| 7,350,951 | B2 |   | 4/2008 | Sakai et al. |

FOREIGN PATENT DOCUMENTS
TW    200825553    6/2008

* cited by examiner

*Primary Examiner* — Meghan Dunwiddie
(74) *Attorney, Agent, or Firm* — Muncy, Geissler, Olds & Lowe, PLLC

(57) ABSTRACT

A radiation structure without a light guiding board for a backlight module or an illuminant device includes an optical plate formed with at least one rising area having a rising surface defined at the center thereof, two light sources disposed adjacent to two sides of the optical plate, and a diffusion plate. The light sources each possess a radiant half-intensity angle below 15 degrees for respectively forming optic axial directions thereof, allowing a radiation field to be diffusively formed from the pivoting of the optic axial directions. Whereby, the optic axial directions respectively face toward the rising surface, allowing the projection of the radiation field on the rising surface, and the diffusion plate is disposed above the rising area of the optical plate. Therefore, an even radiating surface caused by a diffusion of the light sources from the diffusion plate could be preferably obtained even if no light guiding board is applied.

11 Claims, 9 Drawing Sheets

RADIATION STRUCTURE WITHOUT LIGHT GUIDING BOARD

BACKGROUND OF THE INVENTION

1. Field of the Invention

The present invention relates to a radiation structure without a light guiding board, especially to a radiating surface that achieves an even scattering from a diffusion plate even if the guiding board is not used in a backlight module or the like.

2. Description of the Related Art

A conventional backlight module for a liquid crystal display disclosed in Taiwan patent published number 200825553, "A BACKLIGHT MODULE". The referred backlight module comprises at least one light guiding board, at least one light source disposed at one side of the light guiding board, a diffusion plate mounted above the guiding board, not contacting the guiding board, and a mixing cavity defined between the light guiding board and the diffusion plate. Whereby, the streams of light emitted from an emission plane of the light guiding board would be adequately mixed in the mixing cavity, thence allowing the light to be emitted via the diffusion plate toward the backlight module. However, such conventional backlight module includes the following shortcomings:

The design of the backlight module mostly employs the light guiding board to serve as a guiding medium of the light source. Nonetheless, after the light source passing through the light guiding board, certain consumption of energy would lower the emitting efficiency. Especially, in view of the consumption, most side-edged backlight modules in a medium size could merely provide the emitting efficiency less than 70%, and the backlight module adapted to monitors even adversely provides the emitting efficiency just a bit higher than 50%.

"Planar light source device and display device using the same device" issued by a U.S. Pat. No. 7,350,951 reforms the structure of the optical reflector at the bottom thereof to obtain a radiation structure without a light guiding board. Whereby, the emitting efficiency of the light could be increased. However, shortcomings still exist in such disclosure:

Although the optical reflector at the bottom utilizes a raised middle portion to promote the illumination refracted from the diffusion plate, such structure readily has the optical reflector reflect or scatter an uneven luminosity. Namely, the emission plane generated from the refraction of the diffusion plate has an uneven illumination. Additionally, if no optical element is employed to guide the projection of the streams of light, the occurrence of the brighter two sides with a darker middle section would be adversely resulted.

SUMMARY OF THE INVENTION

It is an object of the present invention to provide a radiation structure without a light guiding board for conquering the shortcomings of the conventional structure.

The radiation structure in conformity with the present invention comprises:

an optical plate including at least one rising area disposed thereon; the rising area being formed by a rising surface; two light sources connected to two sides of the optical plate; radiant half-intensity angles of the two light sources being defined below 15 degrees for respectively forming optical axial directions; the optic axial directions of the light sources facing to the rising surface; a radiation field being diffusively formed from a pivoting of the optic axial directions to cast at the rising surface; and a diffusion plate being disposed above a protruding direction of the rising area of the optical plate.

Preferably, the radiant half-intensity angles of the light sources abovementioned are defined from 5 degrees to 15 degrees.

Preferably, the diffusion plate has a side which faces the optical plate and is connected with an inverse prism layer. The inverse prism layer is integrally formed with the diffusion plate or attached to the diffusion plate in a mechanical way.

Preferably, the inverse layer has a serrate cross section.

Preferably, an optical film is provided on the optical plate.

Preferably, a plurality of irregular notches are formed on the rising surface of the rising area of the optical plate.

Preferably, a plurality of V-shaped notches are formed on the rising surface of the rising area of the optical plate.

Preferably, the light sources are LED tubes.

Preferably, two reflecting housings are respectively connected to the two sides of the optical plate, the light sources are fixed in the reflecting housings, and the diffusion plate is connected to the reflecting housings.

Accordingly, the present invention achieves the following advantages:

1. The radiation structure without a light guiding board adapts to reduce the thickness and weight.
2. The notches in an irregular shape or a V-shape formed on the rising surface of the optical plate allow the streams of light to achieve a more even reflection and scattering, so that the illumination of the radiating surface would be more consistent, and the illumination of the radiation structure could be further promoted.
3. Since the radiant half-intensity angles of the light sources are defined below 15 degrees, the light source is able to possess the high directivity. Moreover, due to the fact that the optical axial directions of the light sources face to the rising surface of the rising area on the optical plate, most light are projected onto the optical plate, so that the large amount of light extensively scattered from the diffusion plate would more preferably enhance the radiance thereof.

DETAILED DESCRIPTION OF THE PREFERRED EMBODIMENTS

Figure 1:
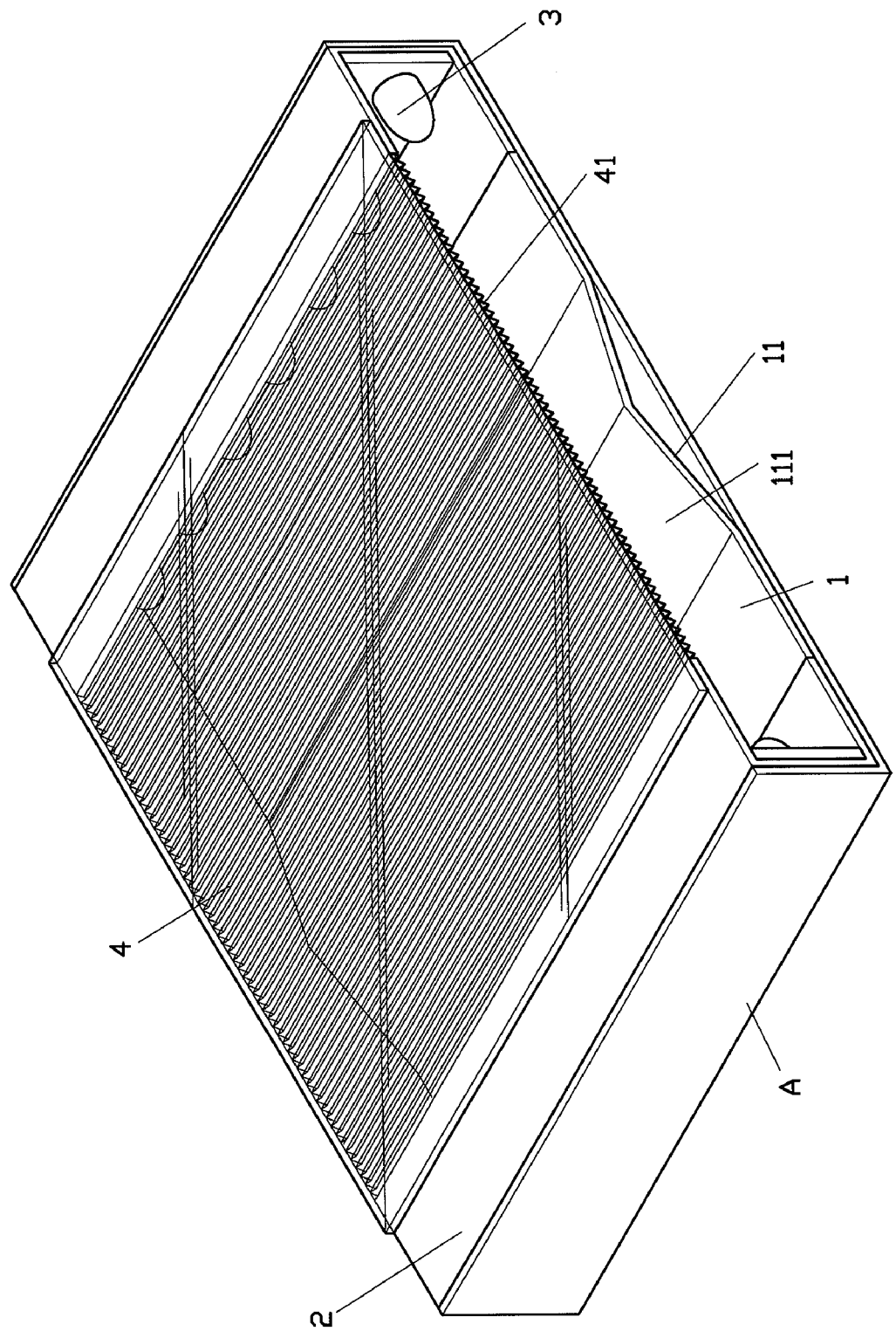
FIG. 1 is a perspective view of the present invention.
Figure 2:
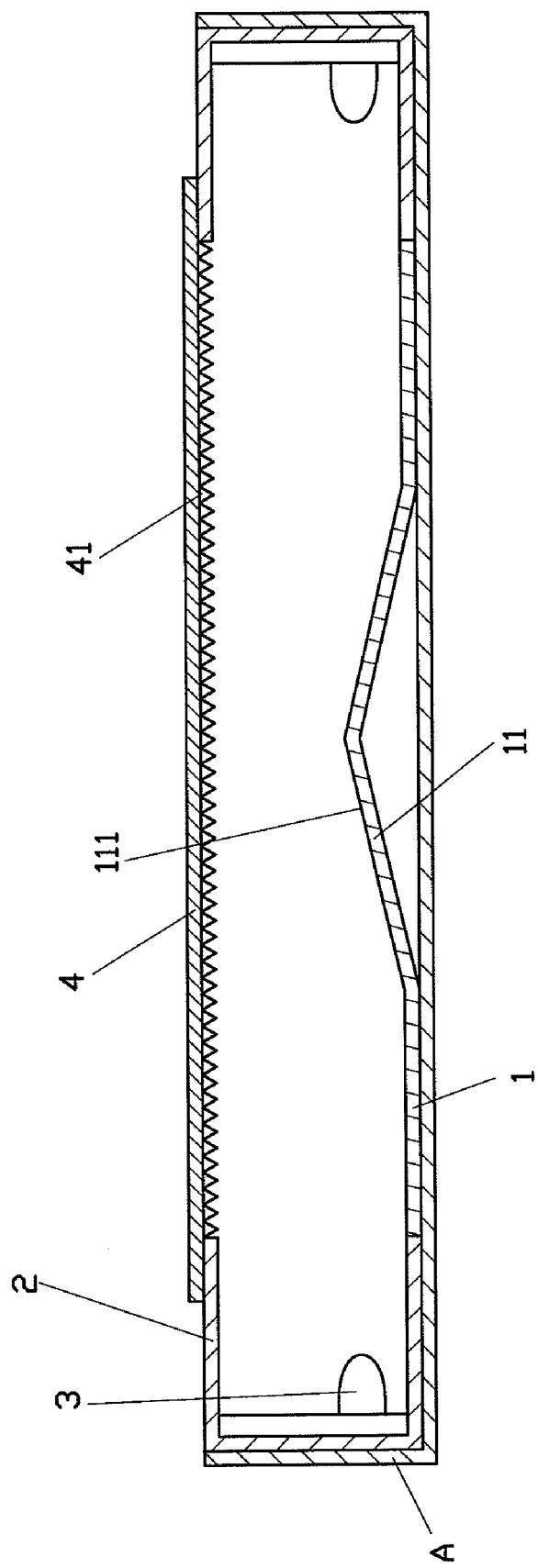
FIG. 2 is a cross-sectional view of the present invention.

Referring to FIGS. 1 and 2, a radiation structure without a light guiding board of the present invention would cooperate with a frame (A), and comprises an optical plate (1), two reflecting housings (2), two light sources (3) and a diffusion plate (4).

Figure 3:
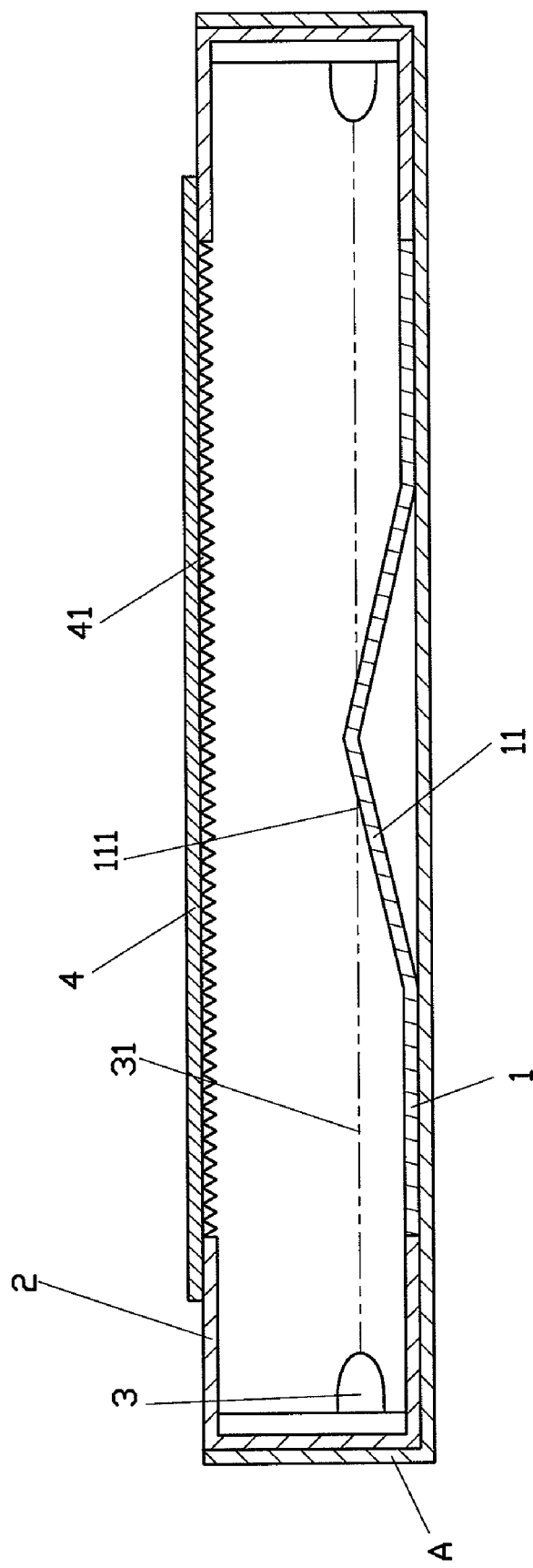
FIG. 3 is a schematic view showing the rising surface with a slanted optic axial direction.
Figure 4:
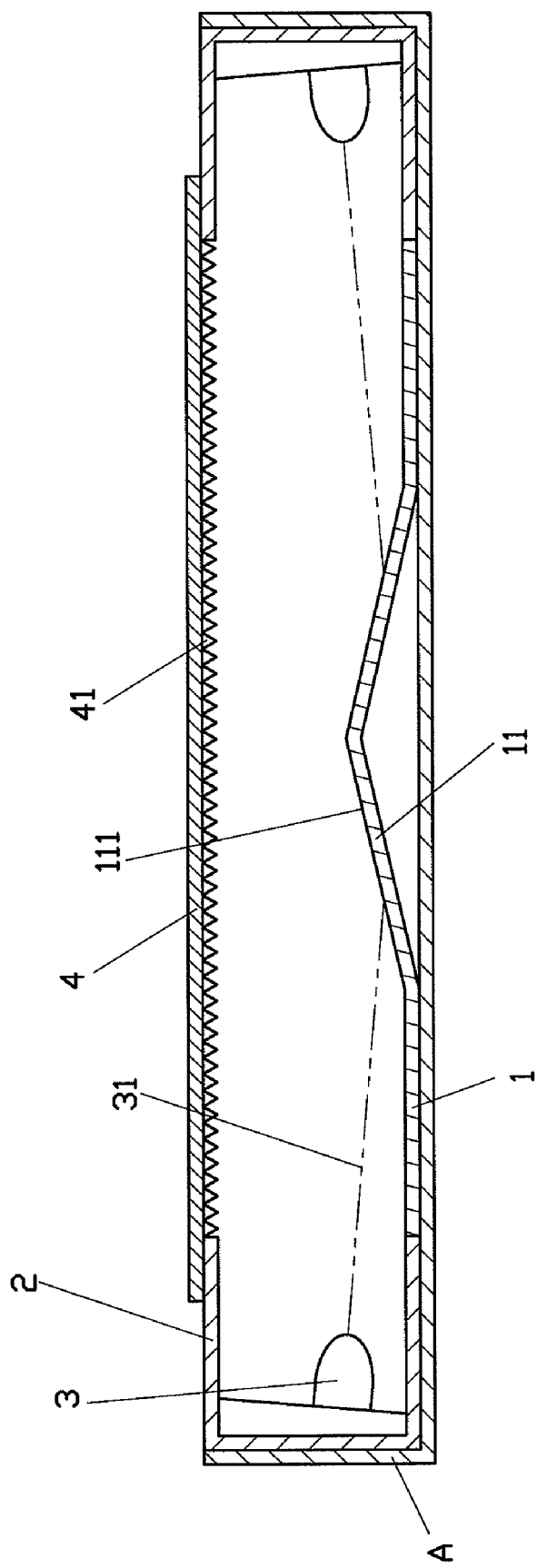
FIG. 4 is a schematic view showing the rising surface with a parallel optic axial direction.
Figure 6:
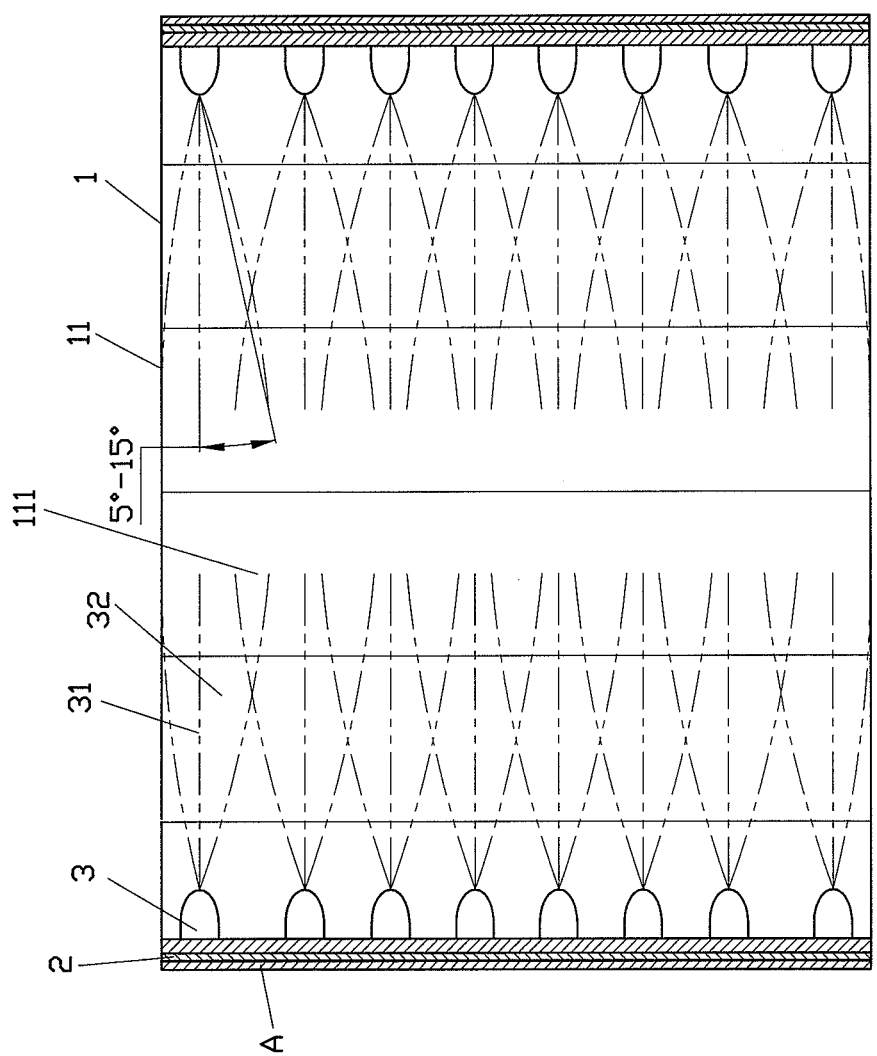
FIG. 6 is another schematic view showing that the light is evenly emitted from the diffusion plate while in using.

The optical plate (1) includes at least one rising area (11) disposed thereon. The rising area (11) is formed by a rising surface (111). The reflecting housings (2) are connected to two sides of the optical plate (1). The light sources (3) adopting LED tubes are disposed close to the two sides of the optical plate (1). Wherein, radiant half-intensity angles of the two light sources (3) are defined below 15 degrees. As it should be, the preferable performance of the radiant half-intensity angles are defined between 5 degrees and 15 degrees. Additionally, the two light sources (3) are contributed to form respective optic axial directions (31) that face to the rising surface (111). As shown in FIGS. 3 and 4, the two light sources (3) emit at different heights and their respective optical axial directions (111) still face to the rising surface (111). Further, a radiation field (32) is diffusively formed from a pivoting of the optic axial direction (31) to cast at the rising surface (111), as shown in FIG. 6. The diffusion plate (4) is disposed above the rising area (11) of the optical plate (1). Wherein, in this embodiment, the diffusion plate (4) is connected to the reflecting housings (2). The diffusion plate (4) has a side which faces the optical plate (1) and is connected with an inverse prim prism layer (41). The inverse prism layer (41) has a serrate cross section.

Figure 5:
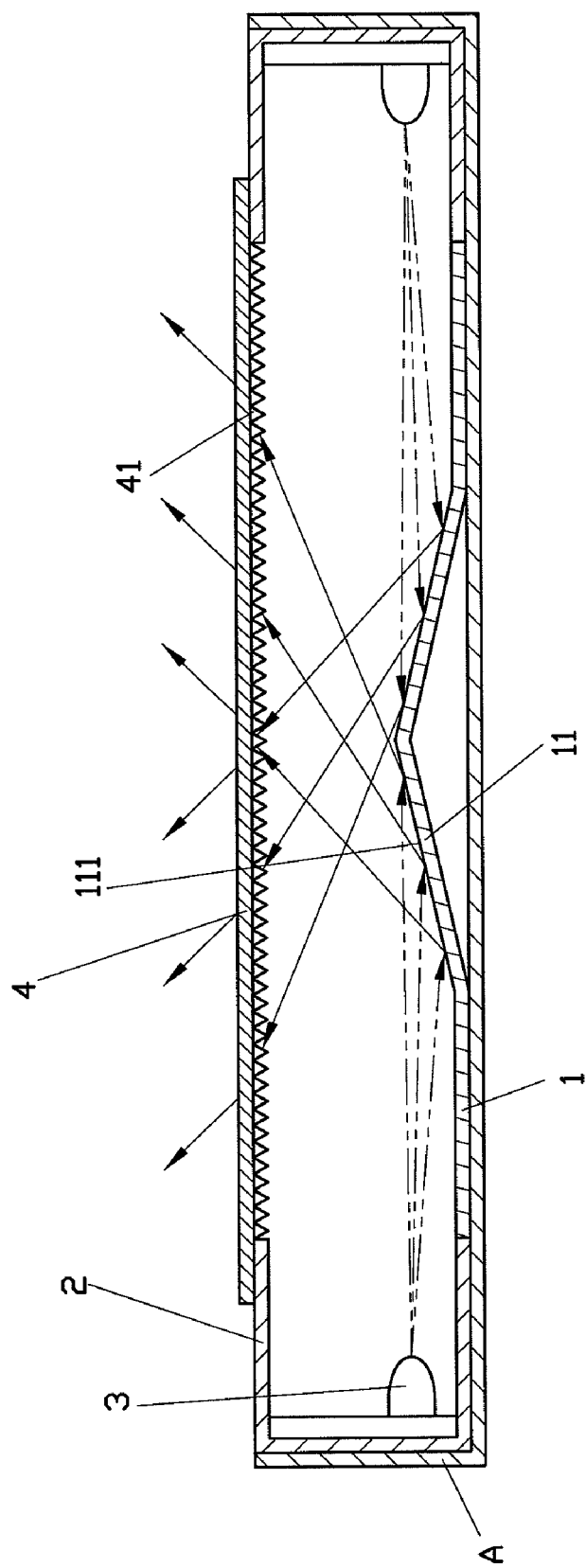
FIG. 5 is a schematic view showing that the light is evenly emitted from the diffusion plate while in using.

Referring to FIGS. 5 and 6, when in use, since the radiant half-intensity angles of the two light sources (3) are defined below 15 degrees, the two light sources (3) are able to possess a high directivity. Moreover, the optic axial directions (31) formed thereby face to the rising surface (111), and the radiation field (32) is projected onto the rising surface (111). As a result, the illumination directly scattered from where diffusion plate (4) is adjacent to the two light sources (3) could be decreased, avoiding the two sides of the diffusion plate (4) to have a stronger illumination than the center thereof. In addition, by means of the reflecting housings (2) reflecting the light from the two light sources (3) that do not cast at the optical plate (1), the luminosity of the entire structure could be promoted. Especially, the closer the about middle portion of the rising area (11) of the optical plate (1) is positioned to the diffusion plate (4), the more the light could be scattered from the diffusion plate (4). Thus, the conventional uneven illumination between the two sides of the diffusion plate (4) and the center thereof could be prevented. Because the inverse prism layer (41) has the serrate cross section, the light casts on the diffusion plate (4) to form an even refraction and scattering. Namely, the diffusion plate (4) is able to provide a constant illumination to form a radiating surface with an average brightness.

Figure 7:
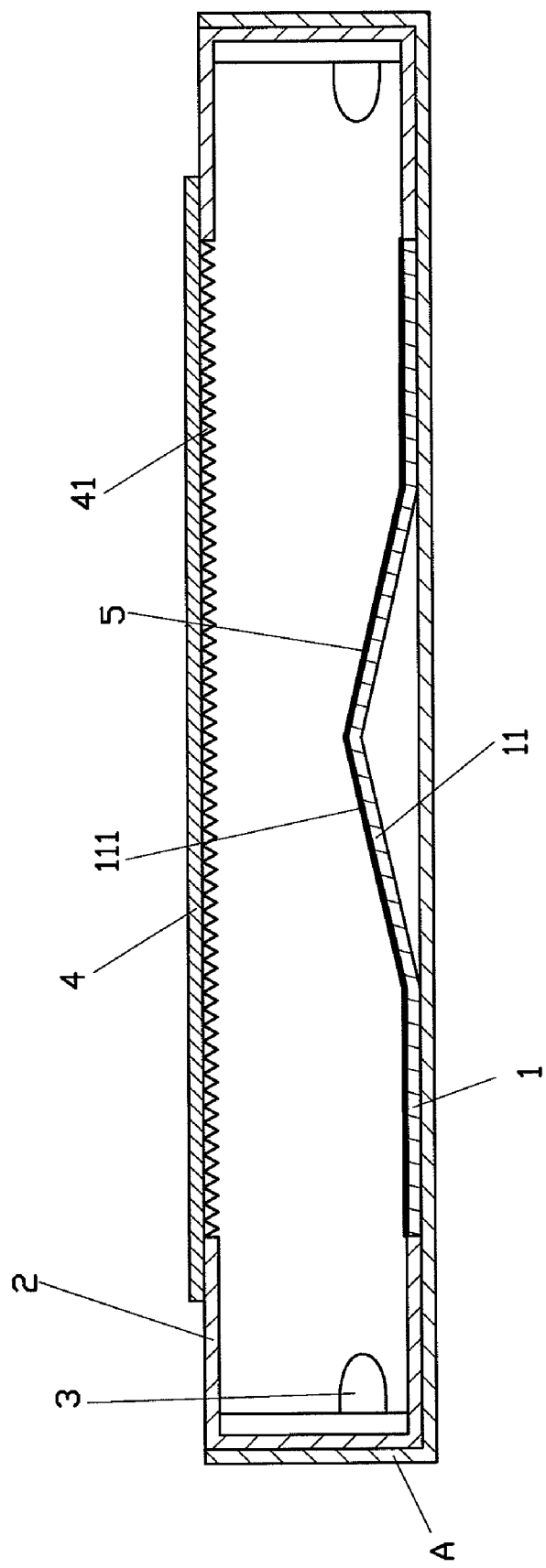
FIG. 7 is a schematic view showing an optical film provided on the rising surface.

Referring to FIG. 7, the rising surface (111) is provided with an optical film (5) that is formed by electroplating, evaporation, or sputtering. Wherein, the optical film (5) is served to collect the emission and increase the reflecting rate, so that the light emitted from the diffusion plate (4) could be further advanced to enhance the illumination thereof.

Figure 8:
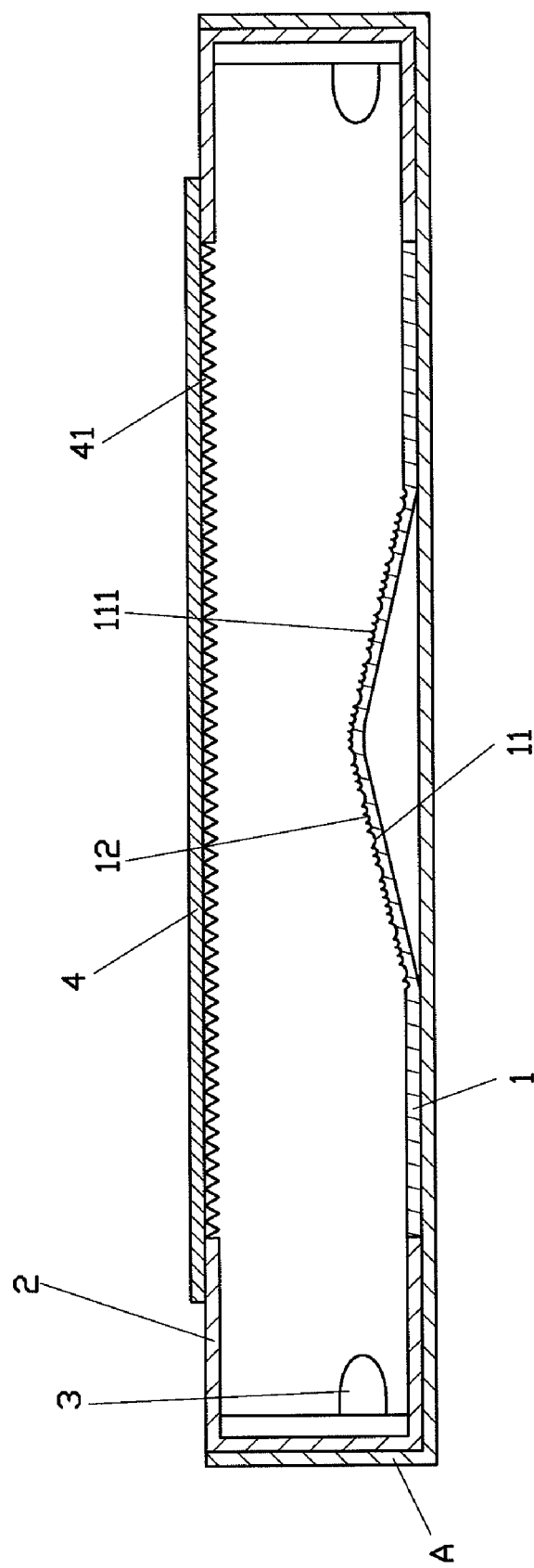
FIG. 8 is a schematic view showing irregular notches formed on the rising surface.

Referring to FIG. 8, a plurality of irregular notches (12) are formed on the rising surface (111) through a sandblasting or a shot peening. Wherein, when the light sources (3) cast light at the notches (12) on the rising surface (111), a more average reflection and scattering could be achieved so as to enhance a more even brightness emitted from the radiating surface of the diffusion plate (4).

Figure 9:
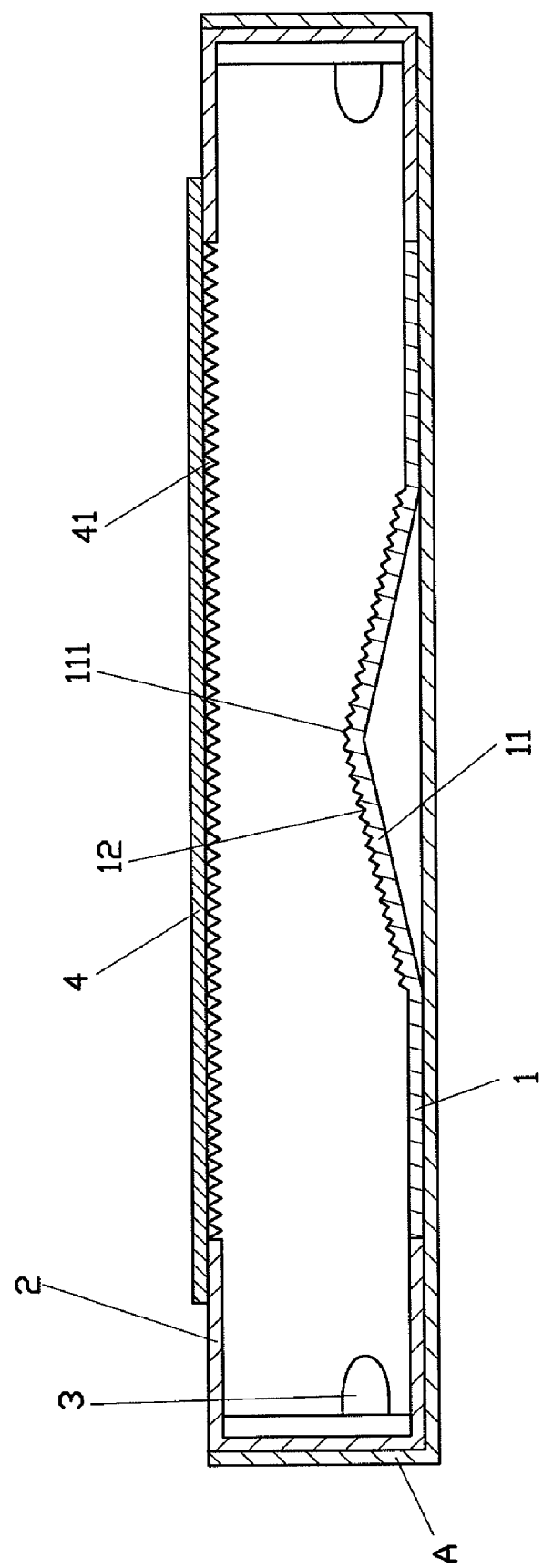
FIG. 9 is a schematic view showing V-shaped notches formed on the rising surface.

Referring to FIG. 9, a plurality of V-shaped notches (13) are formed on the rising surface (111), thereby reflecting the light that casts on the rising surface (111) towards the diffusion plate (4). Therefore, the light emitted from the diffusion plate (4) is able to enhance the illumination.

We claim:

1. A radiation structure without a light guiding board, comprising:
    an optical plate including at least one rising area disposed thereon; said rising area being formed by a rising surface;
    two light sources connected to two sides of said optical plate; radiant half-intensity angles of said two light sources being defined below 15 degrees for forming respective optical axial directions; said optic axial directions of said light sources facing to said rising surface; a radiation field being diffusively formed from a pivoting of said optic axial directions to cast at said rising surface; and
    a diffusion plate disposed above said rising area of said optical plate.

2. The radiation structure as claimed in claim 1, wherein, said radiant half-intensity angles of said light sources are defined from 5 degrees to 15 degrees.

3. The radiation structure as claimed in claim 2, wherein, said diffusion plate has a side which faces the optical plate and is connected with an inverse prism layer.

4. The radiation structure as claimed in claim 3, wherein, said inverse prism layer has a serrate cross section.

5. The radiation structure as claimed in claim 3, wherein, an optical film is disposed on said optical plate.

6. The radiation structure as claimed in claim 3, wherein, a plurality of irregular notches are formed on said rising surface of said rising area of said optical plate.

7. The radiation structure as claimed in claim 3, wherein, a plurality of V-shaped notches are formed on said rising surface of said rising area of said optical plate.

8. The radiation structure as claimed in claim 1, wherein, said light sources are light emitting diode tubes.

9. The radiation structure as claimed in claim 1, wherein, two reflecting housings are connected to the two sides of said optical plate, respectively; said light sources are fixed in said reflecting housings, and said diffusion plate is connected to said reflecting housings.

10. The radiation structure as claimed in claim 1, wherein, a majority of light emitted from the light sources is directed onto the rising surface.

11. The radiation structure as claimed in claim 1, wherein a plurality of light sources is connected to each of two sides of the optical plate, the plurality of light sources being mounted on a flat surface.

* * * * *